US008068836B2

(12) United States Patent
Voyer et al.

(10) Patent No.: US 8,068,836 B2
(45) Date of Patent: Nov. 29, 2011

(54) METHOD AND DEVICE FOR TRANSFERRING AN ONGOING COMMUNICATION IN WHICH A MOBILE TERMINAL IS INVOLVED BETWEEN A FIRST AND A SECOND BASE STATIONS AND WHEREIN ONE OF THE BASE STATIONS IS LOCATED IN A MOVING CONVEYANCE

(75) Inventors: Nicolas Voyer, Rennes (FR); Herve Bonneville, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 859 days.

(21) Appl. No.: 12/030,713

(22) Filed: Feb. 13, 2008

(65) Prior Publication Data

US 2008/0200172 A1    Aug. 21, 2008

(30) Foreign Application Priority Data

Feb. 14, 2007   (EP) .................................... 07003073

(51) Int. Cl.
*H04W 36/00* (2009.01)
*H04B 7/00* (2006.01)

(52) U.S. Cl. ....................... 455/436; 455/524

(58) Field of Classification Search .............. 455/432.1, 455/436–446, 448, 452.2, 456.3
See application file for complete search history.

(56) References Cited

U.S. PATENT DOCUMENTS

| | | | | |
|---|---|---|---|---|
| 5,832,363 A | * | 11/1998 | Moriya et al. ............... | 455/11.1 |
| 6,381,458 B1 | * | 4/2002 | Frodigh et al. ............... | 455/442 |
| 2003/0235165 A1 | | 12/2003 | Wang | |

FOREIGN PATENT DOCUMENTS

| | | |
|---|---|---|
| EP | 1 282 327 A2 | 2/2003 |
| EP | 1 657 942 A1 | 5/2006 |
| JP | 6-255917 | 9/1994 |
| WO | WO 2005/020602 A1 | 3/2005 |

OTHER PUBLICATIONS

Eun Kyoung Paik, et al., "Seamless Mobility Support for Mobile Networks on Vehicles Across Heterogeneous Wireless Access Networks", IEEE Semiannual Vehicular Technology Conference, XP 010862318, vol. 4 of 4, Conf. 57, Apr. 22, 2003, pp. 2437-2441.

* cited by examiner

*Primary Examiner* — Lester Kincaid
*Assistant Examiner* — Joel Ajayi
(74) *Attorney, Agent, or Firm* — Oblon, Spivak, McClelland, Maier & Neustadt, L.L.P.

(57) ABSTRACT

A method and a system for transferring an ongoing communication in which a mobile terminal is involved between a first and a second base stations of a wireless cellular telecommunication network. One of the base stations is located in a moving conveyance. The first base station obtains information indicating that the first base station will become a neighbor of the second base station, identifies a mobile terminal which is currently under communication with a remote telecommunication device through the first base station, transfers a message to the second base station requesting the second base station to prepare resources enabling the continuation of the communication through the second base station, obtains information indicating that the first base station has become a neighbor of the second base station, and transfers the ongoing communication in which the mobile terminal is involved to the second base station.

23 Claims, 6 Drawing Sheets

METHOD AND DEVICE FOR TRANSFERRING AN ONGOING COMMUNICATION IN WHICH A MOBILE TERMINAL IS INVOLVED BETWEEN A FIRST AND A SECOND BASE STATIONS AND WHEREIN ONE OF THE BASE STATIONS IS LOCATED IN A MOVING CONVEYANCE

The present invention relates to a method and a device for transferring an ongoing communication in which a mobile terminal is involved between a first and a second base stations of a wireless cellular telecommunication network, wherein one of the base stations is located in a moving conveyance.

Wireless cellular telecommunication systems are widespread in the world. They offer the possibility to customers to continue a communication with a remote telecommunication device, even if they are moving, thanks to handover procedures between the base stations of the wireless cellular telecommunication system.

In some cases, especially when the mobile terminal is located in a moving conveyance which attenuates the propagation of electromagnetic waveforms, the communication is suddenly interrupted by a loss of the received electromagnetic signal or by an unsuccessful handover between the base stations of the wireless cellular telecommunication system.

Moving conveyances like elevators attenuate the propagation of electromagnetic waveforms. Most elevator cabins are built out of steel, which then forms a Faraday cage. No or strongly attenuated radio waveforms can penetrate into the elevator cabin or go out from the elevator cabin. When the doors of the elevator cabin are closing, the communication of the mobile terminal located inside the cabin, drops, as they can no longer receive any signal from outside the cabin.

One solution could be to set a base station in the elevator cabin. But as the doors of the cabin open during a limited time duration, it is difficult to proceed to some handovers between the base station located outside the cabin and the base station located inside the cabin especially when plural handovers need to be executed. In addition, when the doors of the cabin open abruptly, it causes significant quick variations of inter-cell interference, and brings associated degradation of the provided services within the wireless cellular telecommunication system. As the doors of the cabin can open at any floor, the coordination of radio resource between the base station located inside the elevator cabin and base stations located outside the elevator cabin at any floor, is difficult or inefficient.

In some other cases, especially when the mobile terminal is located in a moving conveyance like a train or a subway train which attenuates the propagation of electromagnetic waveforms, the communication is also suddenly interrupted by a loss of the received electromagnetic signal or by unsuccessful handovers between the base stations of the wireless cellular telecommunication system.

Similar problems as the one disclosed for elevators arise for trains and subway trains.

The aim of the invention is therefore to propose a method and a device which make it possible to avoid any interruption of an ongoing communication when a mobile terminal is moving between two areas, wherein one of the two areas is located in a moving conveyance.

To that end, the present invention concerns a method for transferring an ongoing communication in which a mobile terminal is involved between a first and a second base stations of a wireless cellular telecommunication network, one of the base station being located in a moving conveyance, characterised in that the method comprises the steps executed by the first base station of:

obtaining an information indicating that the first base station will become neighbour of the second base station, identifying a mobile terminal which is currently under communication with a remote telecommunication device through the first base station, transferring a message to the second base station requesting the second base station to prepare resources enabling the continuation of the communication with a remote telecommunication device through the second base station, obtaining an information indicating that the first base station is neighbour of the second base station, transferring the ongoing communication in which the mobile terminal is involved to the second base station.

The present invention concerns also a device for transferring an ongoing communication in which a mobile terminal is involved between a first and a second base stations of a wireless cellular telecommunication network, one of the base station being located in a moving conveyance, characterised in that the device is included in the first base station and comprises:

means for obtaining an information indicating that the first base station will become neighbour of the second base station, means for identifying a mobile terminal which is currently under communication with a remote telecommunication device through the first base station, means for transferring a message to the second base station requesting the second base station to prepare resources enabling the continuation of the communication with a remote telecommunication device through the second base station, means for obtaining an information indicating that the first base station is neighbour of the second base station, means for transferring the ongoing communication in which the mobile terminal is involved to the second base station.

The present invention concerns also a system for transferring an ongoing communication in which a mobile terminal is involved between a first and a second base stations of a wireless cellular telecommunication network, one of the base station being located in a moving conveyance, the system comprising at least the first and second base stations and the moving conveyance characterised in that the first base station comprises:

means for obtaining an information indicating that the first base station will become neighbour of the second base station, means for identifying a mobile terminal which is currently under communication with a remote telecommunication device through the first base station, means for transferring a message to the second base station requesting the second base station to prepare resources enabling the continuation of the communication with a remote telecommunication device through the second base station, means for obtaining an information indicating that the first base station is neighbour of the second base station, means for transferring the ongoing communication in which the mobile terminal is involved to the second base station.

Thus, it is possible to avoid any interruption of an ongoing communication when a mobile terminal which is currently under communication with a remote telecommunication device through the first base station is moving between two areas, wherein one of the two areas is located in a moving conveyance.

Furthermore, by preparing the transfer of the ongoing communication in which the mobile terminal is involved to the second base station prior the first and second base stations become neighbour, the duration of the transfer of the ongoing communication in which the mobile terminal is involved to the second base station is shortened once the first and second base station are neighbour.

According to a particular feature, the first base station manages a first cell in which the mobile terminal is located in, and the first base station:
 obtains an information identifying a second cell managed by the second base station,
 transfers at least the identifier of the second cell to the mobile terminal,
 receives at least one measurement report representative of the signals measured by the mobile terminal in the cells,
 transfers the ongoing communication in which the mobile terminal is involved to the second base station if the quality of signals measured by the mobile terminal in the first cell are lower than a threshold and/or than the quality of signals measured by the mobile terminal in the second cell.

Thus, the mobile terminal is aware it may receive some signals from the second cell and can then start to measure the signals in the first and second cells.

Furthermore, the mobile terminal needs not to measure the signals in all the cells of all the base stations of the wireless cellular telecommunication network in order to detect a transition between the first and the second cells. The processing capabilities of the mobile terminal used for measurements can be minimised.

Furthermore, as the ongoing communication in which the mobile terminal is involved to is transferred to the second base station if the quality of signals measured by the mobile terminal in the first cell are lower than a threshold and/or than the quality of signals measured by the mobile terminal in the first cell the transfer of the ongoing communication is executed only for the mobile terminal which moves from the first cell to the second cell.

If the quality of signals measured by the mobile terminal in the first cell are upper than a threshold and/or than the quality of signals measured by the mobile terminal in the second cell, the transfer of the ongoing communication is not executed because the mobile terminal stays in the first cell.

The ongoing communication is not interrupted even if the mobile terminal moves out or not from the first cell.

According to a particular feature, the first base station receives from the second base station an information indicating that the second base station has prepared resources enabling the continuation of the communication with the remote telecommunication device through the second base station and the ongoing communication in which the mobile terminal is involved is transferred to the second base station if the information indicating that the second base station has prepared resources enabling the continuation of the communication with the remote telecommunication device through the second base station is received.

Thus, the ongoing communication in which the mobile terminal is involved is transferred to the second base station only if the second base station is prepared for the communication transfer. The duration of the transfer of ongoing communication is guarantied to be short.

According to a particular feature, the information indicating that the second base station has prepared resources enabling the continuation of the communication with the remote telecommunication device through the second base station is memorised, the ongoing communication in which the mobile terminal is involved is transferred to the second base station if the information indicating that the second base station has prepared resources enabling the continuation of the communication with the remote telecommunication device through the second base station is memorised, the first base station:
 obtains an information indicating that the second base station will not be a neighbour of the first base station,
 stops to transfer at least the identifier of the second cell managed by the second base station to the mobile terminal,
 sends a message to the second base station requesting the release of the prepared resources enabling the continuation of the communication with the remote telecommunication device through the second base station.
 deletes the memorised information.

Thus, the memory resources of the first base station are managed efficiently and the mobile terminal is informed that it can stop to measure the signals of the cell managed by the second base station. The processing resource of the mobile terminal can be minimised.

Furthermore, the second base station is informed that it can release the prepared resource enabling the continuation of the communication with the remote telecommunication device through the second base station. Resource of second base station can be reused for other communications.

According to a particular feature, at least two mobile terminals are currently under communication with a respective remote telecommunication device through the first base station and the message sent to the second base station requests the release of the prepared resources enabling the continuation of each communication with a remote telecommunication device through the second base station.

Thus, the number of transferred messages is reduced.

According to a particular feature, the first base station executes a radio resources coordination procedure with the second base station.

Thus, there is no conflict between the radio resources used by the first and the second base stations. Furthermore, there is no need to determine radio resources for the first base station which are compatible with plural second base stations as far as the second base stations are not neighbour of the first base station at the same time. The radio resources of the wireless cellular telecommunication network are then used efficiently.

According to a particular feature, the first base station:
 receives a message from the second base station requesting the first base station to prepare resources enabling the continuation, through the first base station, of an ongoing communication in which another mobile terminal is involved,
 prepares resources enabling the continuation of the communication through the first base station,
 transfers to the second base station an information indicating that the first base station has prepared resources enabling the continuation of the communication with the remote telecommunication device through the first base station,
 executes a handover of the communication if a handover completion message is received from the second telecommunication device or from the mobile terminal.

Thus, the first base station is ready to handle the continuation of at least one ongoing communication of a mobile terminal which is susceptible to enter in the cell managed by the first base station.

According to a particular feature, the first base station releases the prepared resources enabling the continuation of the communication in which the other mobile terminal is involved through the first base station if no handover completion message is received from the second base station or if a release message is received from the second base station.

Thus, the resources of the first base station are used efficiently.

According to a particular feature, the moving conveyance is an elevator cabin.

Thus, even if the elevator cabin is build out of steel, which then forms a Faraday cage the ongoing communication is not interrupted when the doors of the elevator cabin close once the mobile terminal is entered into the elevator cabin.

Furthermore, even if the doors of the elevator cabin open during a limited time duration, it is possible to proceed to some handovers between the base station located outside the cabin and the base station located inside the cabin.

According to a particular feature, at least a part of the first base station is included in the elevator cabin and the second base station is located in the destination floor of the elevator cabin.

According to a particular feature, the information indicating that the first base station will become neighbour of the second base station is obtained from information transferred by an elevator controller which determines the destination floor of the elevator cabin and the information indicating that the first base station is neighbour of the second base station is obtained from information transferred by the elevator controller.

Thus, it is possible to determine which base stations will become neighbour very accurately.

According to a particular feature, the first base station comprises means for obtaining information indicating that a first base station will not be a neighbour of the second base station, the information indicating that a first base station will not be a neighbour of the second base station being obtained from information transferred by the elevator controller.

Thus, it is possible to determine when the base stations are no more neighbours.

According to a particular feature, at least a part of the second base station is included in the elevator cabin and the first base station is located in the destination place of the moving conveyance.

Thus, it is possible to allow, for a mobile terminal located in the destination floor and which intends to enter in the elevator cabin, the continuation of the communication through the second base station.

According to a particular feature, the information indicating that the first base station will become neighbour of the second base station is obtained from information transferred by the second base station and the information indicating that the first base station is neighbour of the second base station is obtained from information transferred by the second base station.

Thus, only the base station located in the elevator cabin needs to be connected to the elevator controller. The cabling of the present invention is reduced.

According to a particular feature, the first base station comprises means for obtaining information indicating that a first base station will not be a neighbour of the second base station, the information indicating that a first base station will not be a neighbour of the second base station are obtained from information transferred by the second base station.

Thus, only the base station located in the elevator cabin needs to be connected to the elevator controller. The cabling of the present invention is reduced.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer programs are the same as those set out above related to the method, device and system according to the invention, they will not be repeated here.

The characteristics of the invention will emerge more clearly from a reading of the following description of an example embodiment, the said description being produced with reference to the accompanying drawings, among which:

The present invention is disclosed using an example wherein the moving conveyance is an elevator cabin located in a building which moves from a floor of the building to another floor of the building. The present invention is also applicable to a train or a subway train which moves from a station to the next station.

The building BLD comprises an elevator shaft 60 in which a moving conveyance, like an elevator cabin ELEV is displacing. The elevator cabin ELEV is moving, thanks to an elevator engine 10 controlled by an elevator controller 20, from one floor Flj, with j=1 to N to another floor Fli of the building BLD, with i=1 to N and i≠j, and where N is the number of floors of the building BLD.

Each floor Fli, with i=1 to N comprises at least one call Button BTFi which is linked to the elevator controller 20.

At least one of the floors Fli, with i=1 to N comprises at least one base station BSi. As, example and in a non limitative way, each floor Fli, with i=1 to N comprises one base station BS. Each base station BSi enables the mobile terminals 30 which are located in the cell 15$i$ managed by the base station BSi to establish or receive or continue a communication with a remote telecommunication device not shown in the FIG. 1.

It has to be noted here that, the cell 15$i$ of a base station BSi may cover at least two floors.

Figure 1:
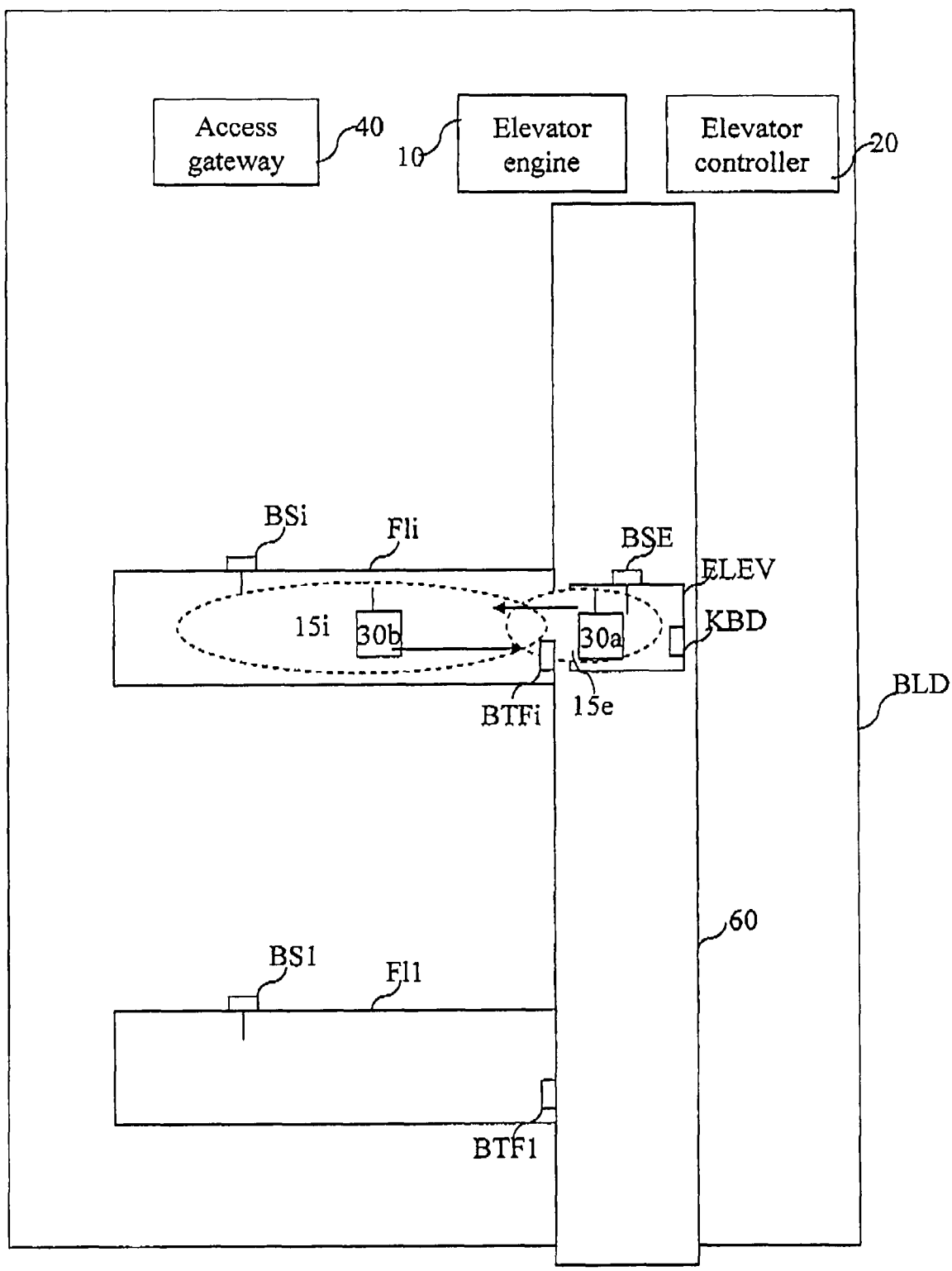
FIG. 1 is a diagram representing a view of a building comprising the wireless telecommunication system for moving conveyances according to the present invention.

Two floors Fl1 and Fli are shown in the FIG. 1 for the sake of clarity. The base station BSi manages the cell noted 15i and the base station BSi manages the cell 15l.

In the FIG. 1, only two mobile terminals 30a and 30b are a shown, but we can understand that a more important number of mobile terminals 30 are comprised in the building BLD. The mobile terminal 30a is located in the cell 15e managed by the base station BSE. When the mobile terminal 30a moves out of the elevator cabin ELEV, it enters in the cell 15i managed by the base station BSi. The mobile terminal 30b is located in the cell 15i managed by the base station BSi.

The elevator cabin ELEV comprises a keyboard KBD which enables the selection of at least one destination floor Fli. The keyboard KBD is linked to the elevator controller 20.

From the keyboard KBD and the call buttons BTF, the elevator controller 20 determines the destination floor Fli of the elevator cabin ELEV, gives related commands to the elevator engine 10 to pull the elevator cabin ELEV to the destination floor Fli, gives related orders to the elevator cabin ELEV to close and/or open the doors of the elevator cabin ELEV.

The elevator cabin ELEV comprises one base station BSE. The base station USE enables the mobile terminals 30 which are located in the cell 15e managed by the base station BSE to establish or receive or continue a communication with a remote telecommunication device not shown in the FIG. 1.

It has to be noted here that the cell 15e is generally restricted to the volume of the elevator cabin ELEV when the elevator doors are closed as the elevator cabin ELEV is generally constituted of metallic parts, and the elevator shaft is generally built of concrete, which limit the propagation of electromagnetic signals. When the doors of the elevator cabin ELEV are opened, the cell 15e enlarges to a part of the volume of the floor Fli at which the elevator cabin ELEV is stopped.

The base stations BSi, with i=1 to N, and the base station BSE are base stations of a wireless cellular telecommunication network.

Preferably, the base stations BSi with i=1 to N, and the base station BSE are linked to an access gateway 40 which is linked to a telecommunication network not shown in the FIG. 1.

The telecommunication network is, as example and in a non limitative way, a dedicated wired network, part of public network like a public switched network, an IP based network, a wireless network, an Asynchronous Transfer Mode network or a combination of above cited networks.

The access gateway 40 is also named a Mobility Management Entity or a Serving GPRS Support Node or a Foreign Agent or a Visitor Location Register or a Public Land Mobility Network server.

The base stations BSi, with i=1 to N and the base station BSE are also named a node or a node B or an enhanced node B or an access point.

The mobile terminals 30 are terminals like mobile phones, personal digital assistants, or personal computers.

Figure 2:
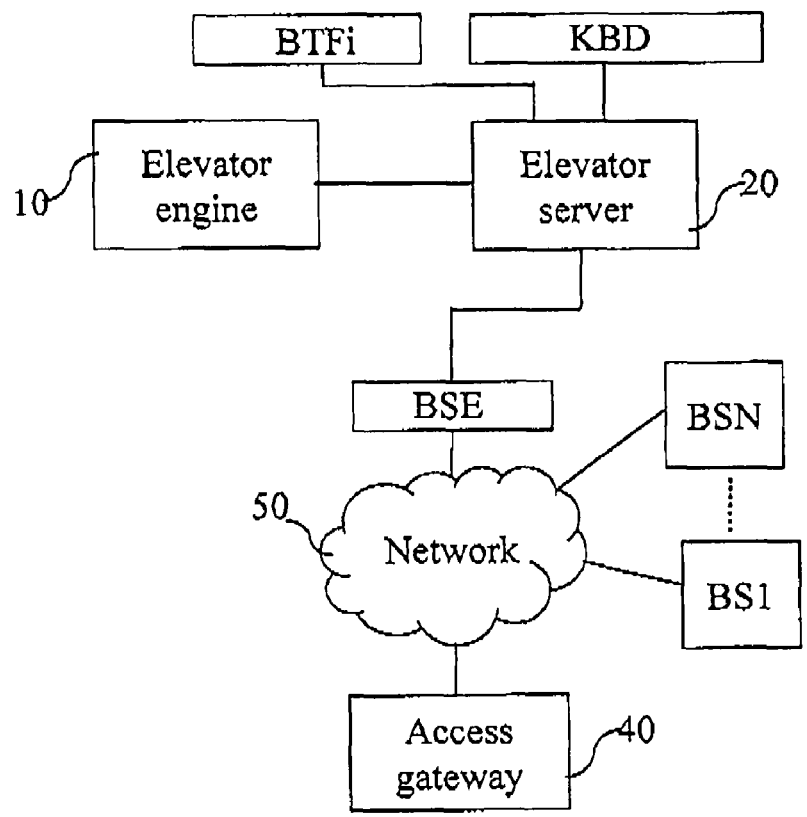
FIG. 2 is a block diagram depicting the interconnections between different devices of the wireless telecommunication system for moving conveyances.

FIG. 2 is a block diagram depicting the interconnections between different devices of the wireless telecommunication system for moving conveyances.

The elevator controller 20 is linked to the call buttons BTFi, with i=1 to N, the keyboard KBD, the elevator engine 10 through a dedicated wiring system.

From the keyboard KBD and the call buttons BTF, the elevator controller 20 determines the destination floor Fli of the elevator cabin ELEV, commands the elevator engine 10 according the determined destination floor Fl in order to move the elevator cabin ELEV to the destination floor Fli. The elevator controller 20 commands also the opening of the doors of the elevator cabin ELEV at the end of motion of the elevator cabin ELEV, and the closing of the doors of the elevator cabin ELEV prior to starting the motion of the elevator cabin ELEV.

The elevator controller 20 is also linked to the base station BSE. According to the invention, the elevator controller 20 transfers messages to the base station BSE indicating information representative of the destination floor Fli of the elevator cabin ELEV. In a variant of realisation, the messages comprise a list, preferably ordered of destination floors Fl.

The elevator controller 20 transfers also messages to the base station BSE indicating if the elevator cabin ELEV is moving and if the elevator's doors are opened.

The base stations BSE and BS1 to BSN are linked together through a network 50. The network 50 is, as example and in a non limitative way, a dedicated wired network, part of public network like a public switched network, an IP based network, a wireless network, an Asynchronous Transfer Mode network or a combination of above cited networks.

The access gateway is also linked to the network 50.

It has to be noted here that, only the base station BSE is linked to the elevator controller 20 in order to reduce the cabling of the wireless telecommunication system for moving conveyances according to the present invention. One skilled man of the art will easily transpose the described embodiment in a system in which each base station BSi with i=1 to N is also linked to the elevator controller 20.

Figure 3:
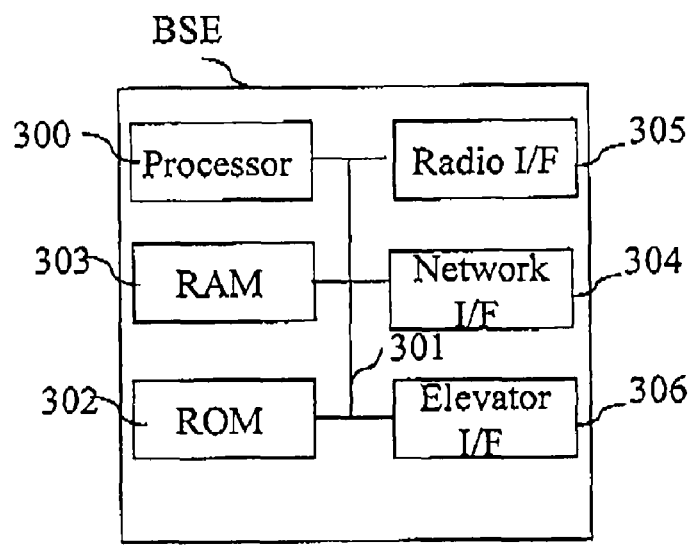
FIG. 3 is a block diagram of a base station according to the present invention.

FIG. 3 is a block diagram of a base station according to the present invention.

Figure 4A:
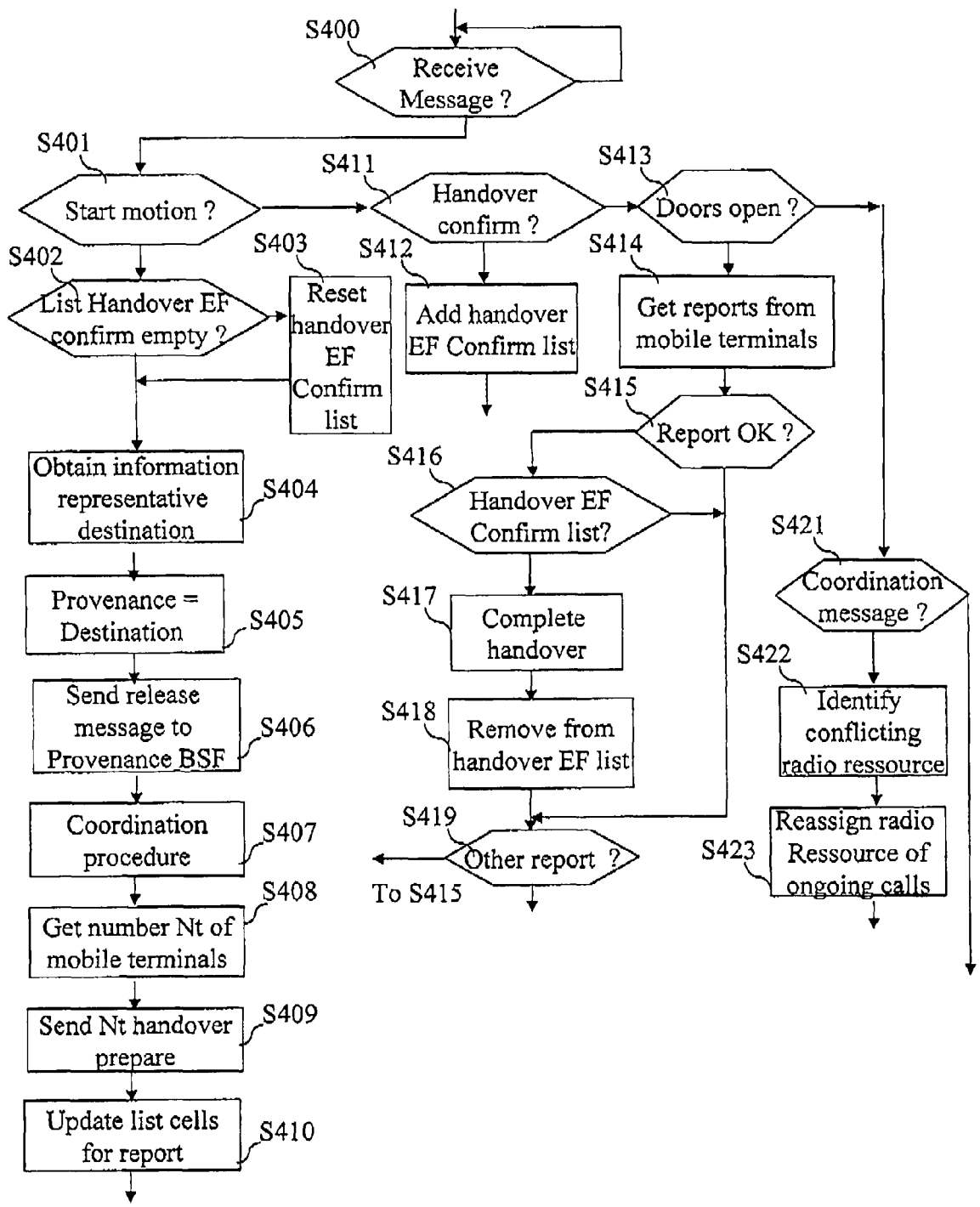
FIG. 4a represents an algorithm executed by a base station comprised in a moving conveyance for managing the ongoing communications handled by mobile terminals which are located in the moving conveyance according to the present invention.
Figure 4B:
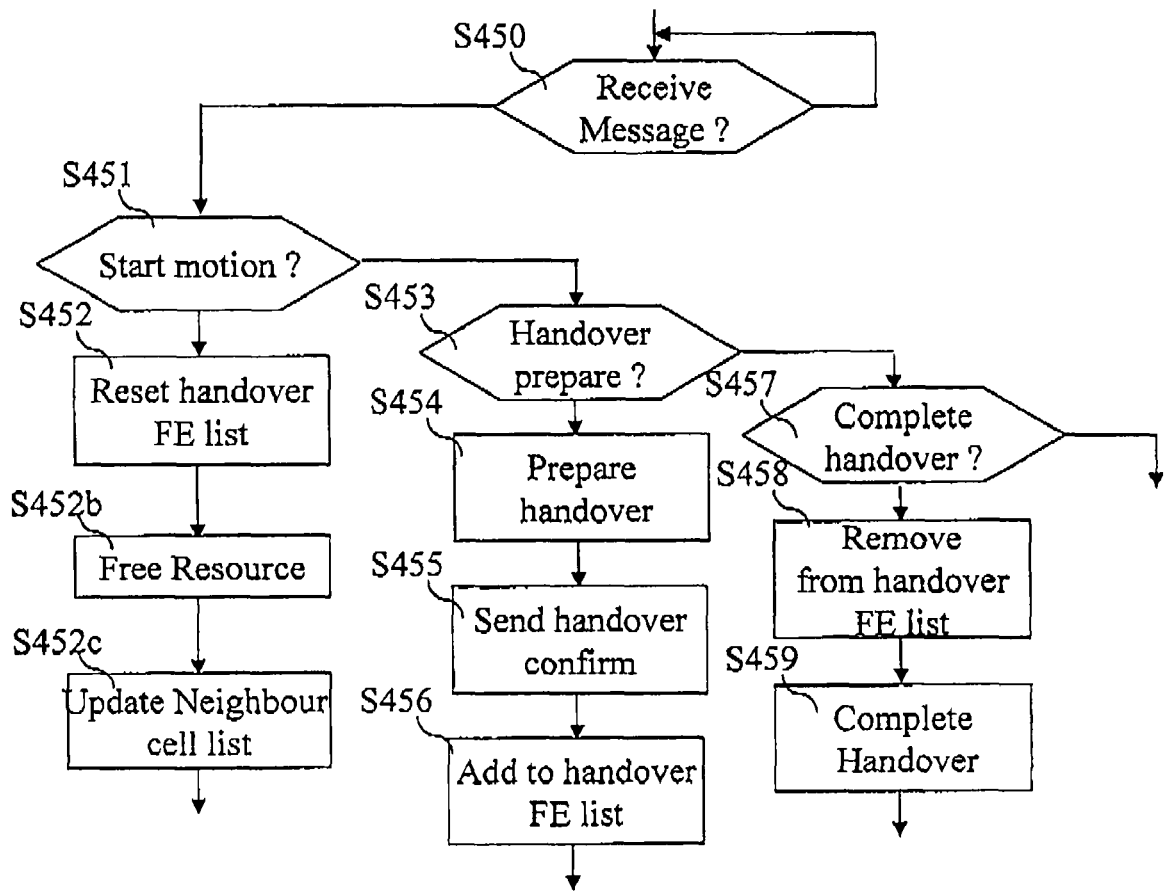
FIG. 4b represents an algorithm executed by a base station comprised in a moving conveyance for mobile terminals which are susceptible to enter in the moving conveyance according to the present invention.
Figure 5A:
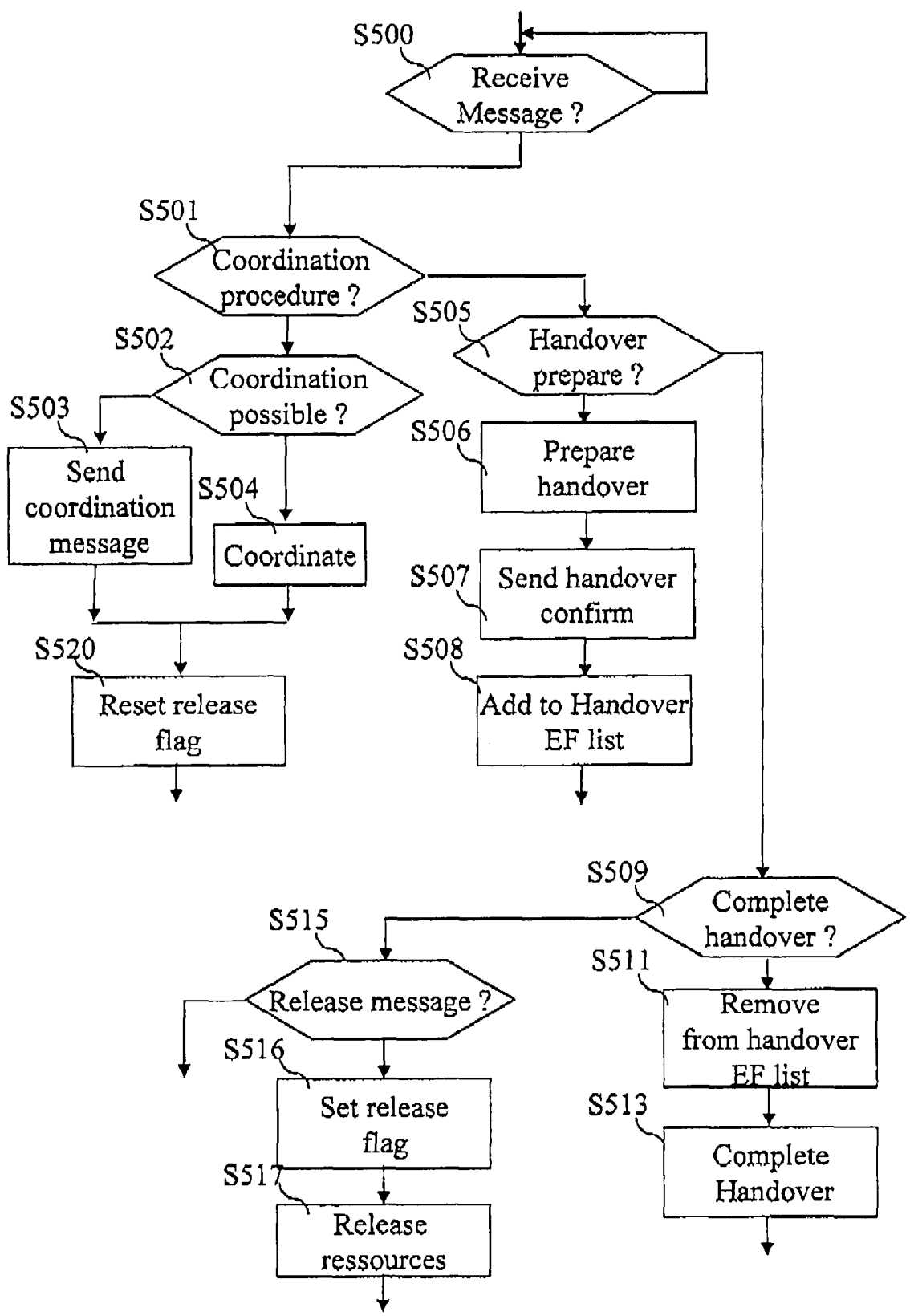
FIG. 5a represents an algorithm executed by a base station located in a floor of a building for managing the mobile terminals which are susceptible to enter in the floor wherein the base station is located according to the present invention.
Figure 5B:
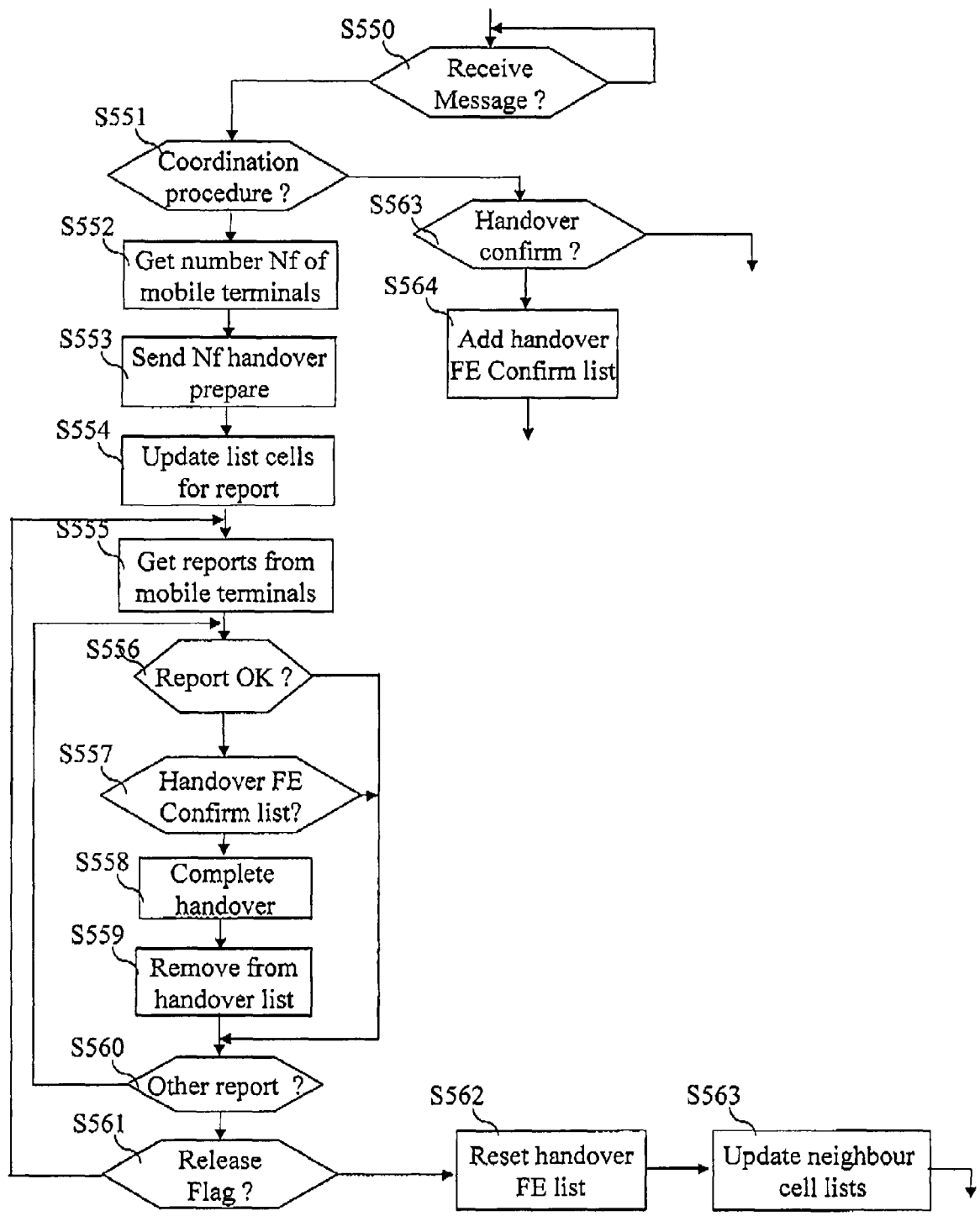
FIG. 5b represents an algorithm executed by a base station located in a floor of a building, for managing the mobile terminals located in the cell of the base station which are susceptible to enter in the moving conveyance according to the present invention.

Each base station BSE or BSi, with i=1 to N, has, for example, an architecture based on components connected together by a bus 301 and a processor 300 controlled by the programs as disclosed in the FIGS. 4a and 4b for the base station BSE and by the programs as disclosed in the FIGS. 5a and 5b for the base stations BSi with i=1 to N.

It has to be noted here that each base station BSi with i=1 to N, or the base station BSE is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303, a network interface 304, a radio interface 305 and, for the base station BSE, an elevator interface 306.

The memory 303 of the base station BSE contains registers intended to receive variables, and the instructions of the programs related to the algorithms as disclosed in the FIGS. 4a and 4b.

The read only memory 302 of the base station BSE contains the instructions of the programs implementing the algorithms of the FIGS. 4a and 4b.

The memory 303 of each base station BSi with i=1 to N, contains registers intended to receive variables, and the instructions of the programs related to the algorithms as disclosed in the FIGS. 5a and 5b.

The read only memory 302 of each base station BSi, with i=1 to N contains the instructions of the programs implementing the algorithms of the FIGS. 5a and 5b.

The processor 300 controls the operation of the network interface 304 and of the radio interface 305.

The base station BSE and each base station BSi, with i=1 to N, is connected to the Access Gateway through the network interface 304 and a network 50.

The processor 300 of the base station BSE receives, through the elevator interface 306, messages from the elevator controller 20 indicating the destination floor Fli of the elevator cabin ELEV. In a variant of realisation, the received message comprises a list, preferably ordered of destination floors Fl.

The processor 300 receives, through the elevator interface 306, messages from the elevator controller 20 indicating if the doors of the elevator cabin ELEV are opened and messages indicating if the elevator cabin ELEV is moving.

FIG. 4a represents an algorithm executed by a base station comprised in a moving conveyance for managing the ongoing communications handled by mobile terminals which are located in the moving conveyance according to the present invention.

More precisely, the present algorithm is executed by the processor 300 of the base station BSE.

At step S400, the processor 300 checks if a message is received through the network interface 304 or through the elevator interface 306 of the base station BSE.

If a message is received, the processor 300 moves to step S401. Otherwise, the processor 300 returns to step 400.

At step S401, the processor 300 checks if the received message is representative of a start of the motion of the elevator cabin ELEV. Such message is transferred by the elevator controller 20 and, as example indicates also the destination floor Fli of the elevator cabin ELEV. In a variant of realisation, the received messages comprise a list, preferably ordered, of destination floors Fli.

If the received message is representative of a start of the motion of the elevator cabin ELEV, the processor 300 moves to step S402. Otherwise, the processor 300 moves to step S411.

At step S402, the processor 300 checks if a list of handover EF confirmation is empty or not. The list of handover EF confirmation is memorized in the RAM memory 303 and comprises, for at least one mobile terminal 30 located in the elevator cabin ELEV the identifier of the base station BSi which sent a handover prepare confirmation message and the identifier of the at least one mobile terminal 30 concerned by the handover prepare.

If the list of handover EF confirmation is not empty, the processor 300 moves to step S403 and resets the content of the list of handover EF confirmation. After that, the processor 300 moves to step S404.

If the list of handover EF confirmation is empty, the processor 300 moves to step S404.

At next step S404, the processor 300 obtains information representative of the destination base station BSi. Using the destination floor Fli indicated in the message received at step S400, the processor 300, using a table stored in the ROM memory 302, determines the identifier of the destination base station BSi. The destination base station BSi is the base station BSi, of which the cell 15i covers the access to the elevator cabin ELEV at the destination floor Fli. The base station BSi is preferably located at the destination floor Fli.

In a variant, the identifier of the base station BSi is transferred by the elevator controller 20.

In another variant, plural identifiers of base stations BSi located at the destination floor Fli are obtained.

At step S405, the processor 300 sets the variable named provenance base station to the value of the identifier of the former destination base station, i.e. the base station BSj, of which the cell 15j covers the access to the elevator cabin ELEV at the floor Flj, the elevator cabin ELEV previously stopped.

At next step S406, the processor 300 commands the transfer, through the network interface 304, of a release message to the provenance base station BSj, where j denotes the identifier of the provenance floor Flj. The release message is interpreted by the base station BSj which receives the message, as a message authorizing the release of coordinated radio resources and/or of a reset of at least one prepared handover for which, the handover has not been completed.

At next step S407, the processor 300 starts a radio resource coordination procedure with the destination base station BSi.

The processor 300 commands the transfer of a message to the destination base station BSi comprising information identifying the radio resources used in the cell 15e of the base station BSE. The radio resources are frequencies and/or time slots and/or codes.

The base station BSi, if needed, modifies the radio resources used in the cell 15i in order to avoid any use of at least one radio resource used in the cell 15e.

The base station BSE, if needed, modifies the radio resources used in the cell 15e in order to avoid any use of at least one radio resource used in the cell 15i. Procedure ends when BSE and BSi have agreed on non overlapping resource usage.

The base station BSi, transfers in response a message to the base station BSE comprising information identifying the radio resources used in the cell 15i, the identifier of the cell 15i of the base station BSi.

At next step S408, the processor 300 gets the number Nt of mobile terminals 30 comprised in the cell 15e which are currently involved in an ongoing communication with a remote telecommunication device.

At next step S409, the processor 300 transfers Nt handover prepare messages to the destination base station BSi. A handover prepare message is a request for preparing a handover for an ongoing communication of a mobile terminal 30 located in the cell 15e. In a variant, only one message is sent for all ongoing communications of the mobile terminals 30 comprised in the cell 15e of the base station BSE which are currently involved in an ongoing communication with a remote telecommunication device.

At next step S410, the processor 300 updates a list of cells for measurement report. The list of cells for measurement report comprises at least the identifier of the cell 15i of the base station BSi located at the destination floor Fli.

It has to be noted here that, the identifier of the cell 15j of the base station BSj is also removed from the list of cells for measurement report.

A measurement report comprises information representative of the signals received by the mobile terminal 30 in the cells 15 of which the identifier is comprised in the list of cells for measurement report.

At the same step, the processor 300 commands the transfer, through the radio interface 305, of the list of cells for measurement report to the mobile terminals 30 comprised in the cell 15e.

After that, the processor 300 returns to step S400.

If at step S401, the received message is not representative of a start of the motion of the elevator cabin ELEV, the processor 300 moves to step S411.

At step S411, the processor 300 checks if the message received at step S400 is a handover prepare confirmation message.

A handover prepare confirmation message is a message transferred by the destination base station BSi in response to a message transferred at step S409 by the base station BSE. The handover prepare confirmation message indicates, that the destination base station BSi is ready to proceed to a handover procedure for one ongoing call identified in the handover prepare confirmation message.

If the message received at step S400 is a handover prepare confirmation message, the processor 300 moves to step S412. Otherwise, the processor 300 moves to step S413.

At step S412, the processor 300 adds, in the handover EF confirmation list, the identifiers of the base station BSi which sent the handover prepare confirmation message and the identifier of the mobile terminal 30 which is currently involved in the ongoing call.

After that, the processor 300 returns to step S400.

At step S413, the processor 300 checks if the message received at step S400 is a message indicating if the doors of the elevator cabin ELEV are opened.

If the message received at step S400 is a message indicating if the doors of the elevator cabin ELEV are opened, the processor 300 moves to step S414. Otherwise, the processor 300 moves to step S421.

The message indicating if the doors of the elevator cabin ELEV are opened is, as example, transferred periodically by the elevator controller 20 as far as the doors of the elevator cabin ELEV remain opened. In a variant, the message is sent only once, at the time of the doors of the elevator cabin ELEV open.

At step S414, the processor 300 commands the transfer of a message to the mobile terminals 30 located in the cell 15e. The message is transferred through the radio interface 305 and is a message requesting a measurement report. In a variant, the step of transmitting the message is realised only once, and requests the mobile terminal to report periodical or event-triggered measurement reports.

In response, the measurement reports are transferred by at least the mobile terminals 30 located in the cell 15e which are currently communicating with a remote telecommunication device.

At next step, S415, the processor 300 selects one measurement report transferred by a mobile terminal 30, as example the mobile terminal 30a, located in the cell 15e which is currently communicating with a remote telecommunication device.

At the same step, the processor 300 checks if the measurement report is correct, i.e. if the information representative of the quality of signals received by the mobile terminal 30a in the cell 15e is lower than a predetermined threshold value and/or lower than information representative of the quality of signals received by the mobile terminal 30a in the cell 15i of which the identifier is comprised in the measurement report list.

The quality of signals is as example and in a non limitative way, the received power of the signals and/or the Signal to Interference plus Noise Ratio of the received signals.

If the measurement report is correct, the processor 300 moves to step S416. Otherwise, the processor 300 moves to step S419.

At step S416, the processor 300 reads the handover EF confirmation list and checks if the identifier of the mobile terminal 30 which sent the selected measurement report is associated to the identifier of a base station BSi.

If the identifier of the mobile terminal 30 which sent the selected measurement report is associated to the identifier of a base station BSi, the processor 300 moves to step S417. Otherwise, the processor 300 moves to step S419.

At step S417, the processor 300 commands the completion of the handover for the ongoing call associated to the identifier of the mobile terminal 30 which sent the selected measurement report.

The processor 300 transfers a handover completion message to the base station BSi.

It has to be noted here that, the handover completion is made only when the doors of the elevator cabin ELEV are opened, if the identifier of the mobile terminal 30 which sent the selected measurement report is associated to the identifier of a base station BSi and if the measurement report is correct.

At next step S418, the processor 300 removes, from the handover EF confirmation list, the identifier of the mobile terminal 30 which sent the selected measurement report.

At next step S419, the processor 300 checks if at least one measurement report received at step S414 has not been selected.

If all the measurement reports received at step S414 have been selected, the processor 300 returns to step S400. Else, the processor 300 moves to step S415.

The loop constituted by the steps S415 to S419 is executed as far as all the measurement reports have been selected.

Considering the example of the FIG. 1, when the doors of the elevator cabin ELEV open, the mobile terminal 30a, which is currently under communication, is located in the cell 15e of the base station BSE. When the user of the mobile terminal 30a moves out from the elevator cabin ELEV, the mobile terminal 30a is located in the cell 15e of the base station BSE and in the cell 15i of the base station BSi. The measurement report transferred by the mobile terminal 30a to the base station BSE is not considered as good for a handover completion. When the user of the mobile terminal 30a continues to move in the floor Fli, the mobile terminal 30a is located in the cell 15e of the base station BSE and in the cell 15i of the base station BSi. As the doors of the elevator cabin ELEV remain opened, the elevator controller 20 transfers another message indicating that the doors of the elevator cabin ELEV are opened. The measurement report transferred by the mobile terminal 30a is considered as good by the base station BSE for a handover completion. The ongoing call is then transferred to and managed by the base station BSi.

If the user of the mobile terminal 30a stays in the elevator cabin ELEV, the mobile terminal 30a is located in the cell 15e of the base station BSE. No measurement report transferred by the mobile terminal 30a is considered as good for a handover completion and the ongoing call remains managed by the base station BSE.

At step S421, the processor 300 checks if the message received at step S400 is a coordination message.

A coordination message is a message transferred by the destination base station BSi, if the destination base station BSi can not modify the radio resources used in the cell 15i in order to avoid any use of at least one radio resource used in the cell 15e.

If the message received at step S400 is a coordination message, the processor 300 moves to step S422. Otherwise, the processor 300 returns to step S400.

At step S422, the processor 300 identifies the conflicting radio resources between the cells 15e and 15i.

At next step S423, the processor 300 reassigns the radio resources used in the cell 15e for at least the ongoing calls.

After that, the processor 300 returns to step S400.

FIG. 4b represents an algorithm executed by a base station comprised in a moving conveyance for mobile terminals which are susceptible to enter in the moving conveyance according to the present invention.

More precisely, the present algorithm is executed by the processor 300 of the base station BSE in parallel with the algorithm of the FIG. 4a.

At step S450, the processor 300 checks if a message is received through the network interface 304 or through the elevator interface 306.

It a variant, the processor 300 checks also if a message is received through the radio interface 305

If a message is received, the processor 300 moves to step S451. Otherwise, the processor 300 returns to step S450.

At step S451, the processor 300 checks if the received message is representative of a start of the motion of the elevator cabin ELEV. Such message is transferred by the elevator controller 20 and further indicates the destination floor Fli of the elevator cabin ELEV. In a variant of realisation, the received messages comprise a list, preferably ordered of destination floors Fl.

If the received message is representative of a start of the motion of the elevator cabin ELEV, the processor 300 moves to step S452. Otherwise, the processor 300 moves to step S453.

At step S452, the processor 300 resets a list of handover FE confirmation. The list of handover FE confirmation is memorized in the RAM memory 303 and comprises, for at least one mobile terminal 30 located in the cell 11 of the base station BSi of the floor Fli, the identifier of the base station BSi which sent the handover prepare message and the identifier of the mobile terminal 30 concerned by the handover prepare confirmation message.

At next step S452*b*, the processor 300 releases the resource prepared after the reception of a handover prepare message sent by the base station BSj of the floor Flj in which the elevator cabin ELEV previously stopped.

At next step S452*c*, the processor 300 updates the list of cells for measurement report. The list of cells for measurement report no longer comprises at least the identifier of the cell 15*j* of the base station BSj located at the floor Flj in which the elevator cabin ELEV previously stopped. At the same step, the processor 300 commands the transfer, through the radio interface 305, of the list of cells for measurement report to the mobile terminals 30 comprised in the cell 15*e*.

After that, the processor 300 returns to step S450.

At step S453, the processor 300 checks if a handover prepare message is received from the destination base station BSi. A handover prepare message is a request for preparing a handover for an ongoing communication of a mobile terminal 30 located in the cell 15*i* of the destination base station BSi.

If a handover prepare message is received from the destination base station BSi, the processor 300 moves to step S454. Otherwise, the processor 300 moves to step S457. The handover prepare message comprises the identifier of the base station BSi and the identifier of the mobile terminal 30 located in the cell 15*i* of the destination base station BSi concerned by the handover prepare message.

At step S454, the processor 300 prepares the handover for the mobile terminal 30 located in the cell 15*i* of the destination base station BSi. The processor 300 reserves the resources of the radio interface 305 and of the network interface 304 for enabling the ongoing communication of the mobile terminal 30 to go through the base station BSE.

At next step S455, the processor 300 commands the transfer, to the destination base station BSi through the network interface 304, of the handover prepare confirmation message which indicates, that the base station BSE is ready to proceed to a handover procedure for the ongoing call.

At next step S456, the processor 300 adds into the list of handover FE confirmation the identifier of the mobile terminal 30 and the identifier of the base station BSi to which the handover prepare confirmation message is transferred.

After that, the processor 300 returns to step S450.

At step S457, the processor 300 checks if the message received at step S450 is a handover completion message. The handover completion message comprises the identifier of the base station BSi and the identifier of the mobile terminal 30 located in the cell 15*i* of the destination base station BSi concerned by the handover.

If the message received at step S450 is a handover completion message, the processor 300 moves to step S458. Otherwise, the processor 300 returns to step S450.

It has to be noted here that, the handover completion message is transferred by the base station BSi concerned by the handover or is forwarded by the concerned mobile terminal 30 in response to a handover completion message transferred by the base station BSi to the mobile terminal 30.

At next step S458, the processor 300 removes, from the handover FE confirmation list, the identifier of the mobile terminal 30 comprised in the handover completion message.

At step S459, the processor 300 commands the completion of the handover for the ongoing call associated to the identifier of the mobile terminal 30 comprised in the handover completion message.

After that, the processor 300 returns to step S450.

FIG. 5*a* represents an algorithm executed by a base station located in a floor of a building for managing the mobile terminals which are susceptible to enter in the floor wherein the base station is located according to the present invention.

More precisely, the present algorithm is executed by the processor 300 of each base station BSi, with i=1 to N.

At step S500, the processor 300 checks if a message is received through the network interface 304.

It a variant, the processor 300 checks also if a message is received through the radio interface 305.

If a message is received, the processor 300 moves to step S501. Otherwise, the processor 300 returns to step S500.

At step S501, the processor 300 checks if the message received at step S500 is coordination procedure message.

If the message received at step S500 is coordination procedure message, the processor 300 moves to step S502. Otherwise, the processor 300 moves to step S505.

The coordination procedure message comprises information identifying the radio resources used in the cell 15*e* of the base station BSE. The radio resources are frequencies and/or time slots and/or codes.

At step S502, the processor 300 checks if the coordination of the radio resources used in the cell 15*e* of the base station BSE and in the cell 15*e* of the base station BSi is possible.

If the coordination of the radio resources is possible, i.e. no conflict exists between the radio resources used by the base station BSi and the base station BSE, the processor 300 moves to step S504. Otherwise, the processor 300 moves to step S503.

At step S503, the processor 300 commands the transfer of a coordination message to the base station BSE.

The coordination message is a message transferred by the destination base station BSi if the destination base station BSi can not modify the radio resources used in the cell 15*i* in order to avoid any use of at least one radio resource used in the cell 15*e*. It contains information about the radio resource used by the destination base station BSi.

After that, the processor 300 moves to step S520.

At step S504, the base station BSi, if needed, modifies the radio resources used in the cell 15*i* in order to avoid any use of at least one radio resource used in the cell 15*e*.

The base station BSi, transfers in response, a message to the base station BSE comprising information identifying the radio resources used in the cell 15*i* and the identifier of the cell 15*i* of the base station BSi.

At next step S520, the processor 300 resets a release flag to the null value.

After that, the processor 300 returns to step S500.

At step S505, the processor 300 checks if a handover prepare message is received from the base station BSE. A handover prepare message is a request for preparing a handover for an ongoing communication of a mobile terminal 30 located in the cell 15e of the base station BSE.

If a handover prepare message is received from the base station BSE, the processor 300 moves to step S506. Otherwise, the processor 300 moves to step S509. The handover prepare message comprises the identifier of the base station BSE and the identifier of the mobile terminal 30 located in the cell 15e of the base station BSE concerned by the handover prepare message and/or information related to on-going communications, such as ciphering keys, Quality of Service, identifier of the communication context in access gateway 40.

At step S506, the processor 300 prepares the handover for the mobile terminal 30 located in the cell 15e. The processor 300 reserves the resources of the radio interface 305 and of the network interface 304 for enabling the ongoing communication of the mobile terminal 30 to go through the base station BSi.

At next step S507, the processor 300 commands the transfer, to the base station BSE through the network interface 304, of the handover prepare confirmation message which indicates, that the base station BSi is ready to proceed to a handover procedure for the ongoing call.

At next step S506, the processor 300 adds, into a list of handover EF confirmation, the identifier of the mobile terminal 30 and the identifier of the base station BSE.

After that, the processor 300 returns to step S500.

At step S509, the processor 300 checks if the message received at step S500 is a handover completion message. The handover completion message comprises the identifier of the base station BSE and the identifier of the mobile terminal 30 located in the cell 15E of the base station BSE concerned by the handover.

It has to be noted here that the handover completion message is transferred by the base station BSi concerned by the handover or is forwarded by the concerned mobile terminal 30 in response to a handover completion message transferred by the base station BSi to the mobile terminal 30.

If the message received at step S500 is a handover completion message, the processor 300 moves to step S511. Otherwise, the processor 300 moves to step S509.

At step S511, the processor 300 removes, from the handover EF confirmation list, the identifier of the mobile terminal 30 comprised in the handover completion message.

At step S512, the processor 300 commands the completion of the handover for the ongoing call associated to the identifier of the mobile terminal 30 comprised in the handover completion message.

After that, the processor 300 returns to step S500.

At step S515, the processor 300 checks if the message received at step S500 is a release message transferred by the base station BSE.

If the message is a release message, the processor 300 moves to step S516. Otherwise, the processor 300 returns to step S500.

At step S516, the processor 300 sets a release flag to the value one.

At next step S517, the processor 300 commands the release of the reserved radio resources for handover or handovers and/or for coordination procedure and resets the content of the handover EF confirm list.

After that, the processor 500 returns to step S500.

FIG. 5b represents an algorithm executed by a base station located in a floor of a building, for managing the mobile terminals located in the cell of the base station which are susceptible to enter in the moving conveyance according to the present invention.

More precisely, the present algorithm is executed by the processor 300 of each base station BSi, with i=1 to N in parallel with the algorithm of the FIG. 5a.

At step S550, the processor 300 checks if a message is received through the network interface 304.

If a message is received, the processor 300 moves to step S551. Otherwise, the processor 300 returns to step S550.

At step S551, the processor 300 checks if the message received at step S550 is a coordination procedure message.

If the message is a coordination procedure message, the processor 300 moves to step S552. Otherwise, the processor 300 moves to step S563.

At step S552, the processor 300 gets the number Nf of mobile terminals 30 comprised in the cell 15i of the base station BSi which are currently involved in an ongoing communication with a remote telecommunication device.

At net step S553, the processor 300 transfers Nf handover prepare messages to the base station BSE. In a variant, only one message is sent for all ongoing communications of the mobile terminals 30 comprised in the cell 15i of the base station BSi which are currently involved in an ongoing communication with a respective remote telecommunication device.

At next step S554, the processor 300 updates a list of cells for measurement report. The list of cells for measurement report comprises at least the identifier of the cells 15c of the base station BSE.

At the same step, the processor 300 commands the transfer, through the radio interface 305, of the list of cells for measurement report to the mobile terminals 30 comprised in the cell 15i.

At next step S555, the processor 300 commands the transfer of a message to the mobile terminals 30 located in the cell 15i. The message is transferred through the radio interface 305 and is a message requesting a measurement report.

In response, the measurement reports are transferred by at least the mobile terminals 30 located in the cell 15i which are currently communicating with a remote telecommunication device.

At next step, S556, the processor 300 selects one measurement report transferred by a mobile terminal 30 located in the cell 15i which is currently communicating with a remote telecommunication device.

At the same step, the processor 300 checks if the measurement report is correct, i.e. if the information representative of the quality of signals received by the mobile terminal 30 in the cell 15i is lower than a predetermined threshold and/or is lower than information representative of the quality of signals received by the mobile terminal 30 in the cell 15e of which the identifier is comprised in the measurement report list.

If the measurement report is correct, the processor 300 moves to step S557. Otherwise, the processor 300 moves to step S560.

At step S557, the processor 300 reads the handover FE confirmation list and checks if the identifier of the mobile terminal 30 which sent the selected measurement report is associated to the identifier of the base station BSE.

If the identifier of the mobile terminal 30 which sent the selected measurement report is not associated to the identifier of the base station BSE, the processor 300 moves to step S560. Otherwise, the processor 300 moves to step S558.

At step S558, the processor 300 commands the completion of the handover for the ongoing call associated to the identifier of the mobile terminal 30 which sent the selected measurement report.

The processor 300 transfers a handover completion message to the base station BSe.

At next step S559, the processor 300 removes, from the handover EF confirmation list, the identifier of the mobile terminal 30 which sent the selected measurement report.

At next step S560, the processor 300 checks if at least one measurement report received at step S555 has not been selected.

If at least one measurement report received at step S555 has not been selected, the processor 300 returns to step S556.

The loop constituted by the steps S556 to S560 is executed as far as all the measurement reports have been selected.

If all the measurement reports received at step S555 have been selected, the processor 300 moves to step S561.

At step S561, the processor 300 checks if the value of the release flag is to equal to the value one.

If the value of the release flag is equal to the value one, it means that the elevator cabin ELEV is now moving, that the doors of the elevator cabin ELEV are closed and that it is not possible anymore to proceed to a handover completion. The processor 300 moves then to step S562.

At step S562, the processor 300 resets the content of the list of handover FE confirmation.

At next step S563, the processor 300 updates the list of neighbour cells by removing the identifier of the cell of the base station BSE from the list.

The processor 300 returns then to step S550.

If the value of the release flag is equal to null value, it means that it is still possible to proceed to at least one handover completion. The processor 300 returns then to step S555.

Naturally, many modifications can be made to the embodiments of the invention described above without departing from the scope of the present invention.

The invention claimed is:

1. A method for transferring an ongoing communication in which a mobile terminal is involved between a first and a second base stations of a wireless cellular telecommunication network, one of the base stations being located in a moving conveyance, the method executed by the first base station comprising:
   obtaining information indicating that the first base station will become a neighbour of the second base station;
   identifying a mobile terminal which is currently under communication with a remote telecommunication device through the first base station;
   transferring a message to the second base station requesting the second base station to prepare resources enabling the continuation of the communication with a remote telecommunication device through the second base station;
   subsequently obtaining information indicating that the first base station has become a neighbour of the second base station; and
   transferring the ongoing communication in which the mobile terminal is involved to the second base station, wherein,
   the method further comprises executing a resources coordination procedure with the second base station such that no conflict exists between the radio resources used by the first and second base stations, and
   the method executed by one base station of the first and second base stations further comprises:
   receiving a message from the other of the first and second base stations, the transferred message comprising information identifying the radio resources used by the one base station; and
   modifying the radio resources used by the one base station in order to avoid any use of at least one radio resource used by the other base station.

2. The method according to claim 1, wherein the first base station manages a first cell in which the mobile terminal is located, the method comprises further comprising:
   obtaining information identifying a second cell managed by the second base station;
   transferring at least the identifier of the second cell to the mobile terminal;
   receiving at least one measurement report representative of the signals measured by the mobile terminal in the cells; and
   transferring to the second base station the ongoing communication in which the mobile terminal is involved if the quality of signals measured by the mobile terminal in the first cell are lower than a threshold and/or lower than the quality of signals measured by the mobile terminal in the second cell.

3. The method according to claim 2, the method further comprising:
   receiving from the second base station information indicating that the second base station has prepared resources enabling the continuation of the communication with the remote telecommunication device through the second base station, wherein
   the ongoing communication in which the mobile terminal is involved is transferred to the second base station if the information indicating that the second base station has prepared resources enabling the continuation of the communication with the remote telecommunication device through the second base station is received.

4. The method according to claim 2, wherein,
   the information indicating that the second base station has prepared resources enabling the continuation of the communication with the remote telecommunication device through the second base station is stored,
   the ongoing communication in which the mobile terminal is involved is transferred to the second base station if the information indicating that the second base station has prepared resources enabling the continuation of the communication with the remote telecommunication device through the second base station is stored,
   the method further comprising:
   obtaining information indicating that the second base station will not be a neighbour of the first base station;
   stopping to transfer at least the identifier of the second cell managed by the second base station to the mobile terminal;
   sending a message to the second base station, requesting the release of the prepared resources enabling the continuation of the communication with the remote telecommunication device through the second base station; and
   deleting the stored information.

5. The method according to claim 4, wherein,
   at least two mobile terminals are currently under communication with a respective remote telecommunication device through the first base station, and
   the message sent to the second base station requests the release of the prepared resources enabling the continuation of each communication with a remote telecommunication device through the second base station.

6. The method according to any of the claims 1 to 5, the method further comprising:
   receiving a message from the second base station requesting the first base station to prepare resources enabling the continuation, through the first base station, of an ongoing communication in which another mobile terminal is involved;
   preparing resources enabling the continuation of the communication through the first base station;
   transferring to the second base station information indicating that the first base station has prepared resources enabling the continuation of the communication with the remote telecommunication device through the first base station; and
   executing a handover of the communication if a handover completion message is received from the second telecommunication device or from the mobile terminal.

7. The method according to claim 6, the method further comprising:
   releasing the prepared resources enabling the continuation of the communication in which the mobile terminal is involved through the first base station if no handover completion message is received from the second base station or if a release message is received from the second base station.

8. A device for transferring an ongoing communication in which a mobile terminal is involved between a first and a second base stations of a wireless cellular telecommunication network, one of the base stations being located in a moving conveyance, wherein the device is included in the first base station and comprises:
   means for obtaining information indicating that the first base station will become a neighbour of the second base station;
   means for identifying a mobile terminal which is currently under communication with a remote telecommunication device through the first base station;
   means for transferring a message to the second base station requesting the second base station to prepare resources enabling the continuation of the communication with a remote telecommunication device through the second base station;
   means for subsequently obtaining information indicating that the first base station has become a neighbour of the second base station; and
   means for transferring the ongoing communication in which the mobile terminal is involved to the second base station, wherein,
   the device further comprises means for executing a resources coordination procedure between the first and second base stations such that no conflict exists between the radio resources used by the first and second base stations, and
   the device further comprises means for:
   receiving a message from the second base, the received message comprising information identifying the radio resources used by said second base station; and
   modifying the radio resources used by said first base station in order to avoid any use of at least one radio resource used by said second base station.

9. A system for transferring an ongoing communication in which a mobile terminal is involved between a first and a second base stations of a wireless cellular telecommunication network, one of the base stations being located in a moving conveyance, the system comprising at least the first and second base stations and the moving conveyance, the first base station comprising:
   means for obtaining information indicating that the first base station will become a neighbour of the second base station;
   means for identifying a mobile terminal which is currently under communication with a remote telecommunication device through the first base station;
   means for transferring a message to the second base station requesting the second base station to prepare resources enabling the continuation of the communication with a remote telecommunication device through the second base station;
   means for subsequently obtaining information indicating that the first base station has become a neighbour of the second base station; and
   means for transferring the ongoing communication in which the mobile terminal is involved to the second base station, wherein,
   the system further comprises means for executing a resources coordination procedure between the first and second base stations such that no conflict exists between the radio resources used by the first and second base stations, and
   the system further comprises means for executing by one base station of the first and second base stations, comprising:
   receiving a message from the other of the first and second base stations, the transferred message comprising information identifying the radio resources used by the one base station; and
   modifying the radio resources used by the one base station in order to avoid any use of at least one radio resource used by the other base station.

10. The system according to claim 9, wherein the moving conveyance is an elevator cabin.

11. The system according to claim 10, wherein the first base station manages a first cell in which the mobile terminal is located, and in that the first base station comprising:
   means for obtaining information identifying a second cell managed by the second base station;
   means for transferring at least the identifier of the second cell to the mobile terminal;
   means for receiving at least one measurement report representative of the signals measured by the mobile terminal in the cells; and
   means for transferring to the second base station the ongoing communication in which the mobile terminal is involved if the quality of signals measured by the mobile terminal in the first cell are lower than a threshold and/or lower than the quality of signals measured by the mobile terminal in the second cell.

12. The system according to claim 11, the first base station further comprising:
   means for receiving from the second base station an information indicating that the second base station has prepared resources enabling the continuation of the communication with the remote telecommunication device through the second base station, wherein
   the ongoing communication in which the mobile terminal is involved is transferred to the second base station if the information indicating that the second base station has prepared resources enabling the continuation of the communication with the remote telecommunication device through the second base station is received.

13. The system according to claim 11, wherein, the information indicating that the second base station has prepared resources enabling the continuation of the communication with the remote telecommunication device through the second base station is stored, the ongoing communication in which the mobile terminal is involved is transferred to the second base station if the information indicating that the second base station has prepared resources enabling the continuation of the communication with the remote telecommunication device through the second base station is memorized, and, the first base station comprises:
for obtaining information indicating that the second base station will not be a neighbour of the first base station;
means for stopping to transfer at least the identifier of the second cell managed by the second base station to the mobile terminal;
means for sending a message to the second base station, requesting the release of the prepared resources enabling the continuation of the communication with the remote telecommunication device through the second base station; and
means for deleting the stored information.

14. The system according to claim 13, wherein,
at least two mobile terminals are currently under communication with a respective remote telecommunication device through the first base station, and
the message sent to the second base station requests the release of the prepared resources enabling the continuation of each communication with a remote telecommunication device through the second base station.

15. The system according to any of claims 10 to 14, wherein,
at least a part of the first base station is included in the elevator cabin, and
the second base station is located in a destination floor of the elevator cabin.

16. The system according to claim 15, wherein,
the information indicating that the first base station will become a neighbour of the second base station is obtained from information transferred by an elevator controller which determines the destination floor of the elevator cabin, and
the information indicating that the first base station is a neighbour of the second base station is obtained from information transferred by the elevator controller.

17. The system according to claim 16, wherein the first base station comprises:
means for obtaining information indicating that the first base station will not be a neighbour of the second base station, the information indicating that the first base station will not be a neighbour of the second base station being obtained from information transferred by the elevator controller.

18. The system according to claim 10, wherein,
at least a part of the second base station is included in the elevator cabin, and
the first base station is located in the destination place of the moving conveyance.

19. The system according to claim 18, wherein,
the information indicating that the first base station will become a neighbour of the second base station is obtained from information transferred by the second base station, and
the information indicating that the first base station is a neighbour of the second base station is obtained from information transferred by the second base station.

20. The system according to claim 19, wherein the first base station comprises:
means for obtaining information indicating that the first base station will not be a neighbour of the second base station, the information indicating that the first base station will not be a neighbour of the second base station being obtained from information transferred by the second base station.

21. A computer program, recorded on a non-transitory storage medium, which can be directly loadable into a programmable device, comprising instructions or portions of code for implementing the method according to any of claims 1 to 5, when said computer program is executed on a programmable device.

22. The method according to claim 1, wherein executing the resources coordination procedure comprises finding an agreement on non-overlapping resource usage with the second base station.

23. The method according to claim 22, the method further comprising:
transferring a message to the second base station comprising information identifying the radio resources used by the first base station.

\* \* \* \* \*